(12) United States Patent
Sugie et al.

(10) Patent No.: US 12,312,481 B2
(45) Date of Patent: May 27, 2025

(54) AQUEOUS INK, INK CARTRIDGE AND INK JET RECORDING METHOD

(71) Applicant: CANON KABUSHIKI KAISHA, Tokyo (JP)

(72) Inventors: Misaki Sugie, Kanagawa (JP); Yuki Nishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 17/947,335

(22) Filed: Sep. 19, 2022

(65) Prior Publication Data

US 2023/0287228 A1 Sep. 14, 2023

(30) Foreign Application Priority Data

Sep. 28, 2021 (JP) ................. 2021-158230
Aug. 30, 2022 (JP) ................. 2022-136912

(51) Int. Cl.
*C09D 11/324* (2014.01)
*B41J 2/21* (2006.01)
*C09D 11/38* (2014.01)

(52) U.S. Cl.
CPC ............ *C09D 11/324* (2013.01); *C09D 11/38* (2013.01); *B41J 2/2107* (2013.01)

(58) Field of Classification Search
CPC .................................................. C09D 11/32
See application file for complete search history.

(56) References Cited

U.S. PATENT DOCUMENTS

| | | | |
|---|---|---|---|
| 9,493,664 B2 | 11/2016 | Tsuji et al. | |
| 9,605,170 B2 | 3/2017 | Nakagawa et al. | |
| 9,956,761 B2 | 5/2018 | Yamashita | |
| 10,106,696 B2 | 10/2018 | Liu | |
| 10,259,963 B2 | 4/2019 | Masada et al. | |
| 10,266,714 B2 | 4/2019 | Tsuji et al. | |
| 10,280,322 B2 | 5/2019 | Masada | |
| 10,280,323 B2 | 5/2019 | Fujimoto et al. | |
| 10,487,229 B2 | 11/2019 | Nishino et al. | |
| 2005/0228069 A1* | 10/2005 | Kataoka | C09C 3/10 523/160 |
| 2009/0195579 A1* | 8/2009 | Tousi | B41J 2/2125 347/14 |
| 2013/0065028 A1* | 3/2013 | Fujii | C09D 7/20 524/106 |
| 2015/0376428 A1* | 12/2015 | Sanada | C09D 11/322 347/20 |
| 2016/0222239 A1* | 8/2016 | Nakata | C09D 11/102 |
| 2017/0137650 A1 | 5/2017 | Liu et al. | |
| 2017/0183525 A1* | 6/2017 | Fujioka | B41J 2/2107 |
| 2017/0183526 A1* | 6/2017 | Yamashita | C09D 11/322 |
| 2018/0112091 A1 | 4/2018 | Masada et al. | |
| 2018/0258299 A1* | 9/2018 | Fujimoto | B41J 2/17553 |

FOREIGN PATENT DOCUMENTS

| | | |
|---|---|---|
| CN | 108431142 A | 8/2018 |
| EP | 3187552 A1 | 7/2017 |
| EP | 3312247 A1 | 4/2018 |
| JP | 2005200566 A * | 7/2005 |
| JP | 2014-173082 A | 9/2014 |
| JP | 2016-145336 A | 8/2016 |
| JP | 2017-136846 A | 8/2017 |
| JP | 2019-143095 A | 8/2019 |
| WO | 2017087635 A1 | 5/2017 |

OTHER PUBLICATIONS

European Search Report issued in corresponding European Application No. 22194287.3 dated Feb. 6, 2023.
Chinese Office Action issued in corresponding Chinese Application No. 202211187801.4 dated Apr. 1, 2024.
Chinese Office Action issued in corresponding Chinese Application No. 202211187801.4 dated Nov. 11, 2024.
Chinese Office Action issued in corresponding Chinese Application No. 202211187801.4 dated Apr. 1, 2025.

* cited by examiner

*Primary Examiner* — Shelby L Fidler
(74) *Attorney, Agent, or Firm* — Venable LLP

(57) ABSTRACT

Provided is an aqueous ink for ink jet that can record an image excellent in a color developability by suppressing a bronze phenomenon derived from a carbon black. The aqueous ink for ink jet contains: a self-dispersible carbon black; and a resin particle formed of an acrylic resin. The carbon black has a DBP oil absorption of 120 mL/100 g or more, the acrylic resin particle has a glass transition temperature of 30° C. or more, and a mass ratio of a content (% by mass) of the resin particle to a content (% by mass) of the carbon black is 0.10 times or more to 2.0 times or less.

20 Claims, 2 Drawing Sheets

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

The number of opportunities for an ink jet recording method to be utilized in an application where a business document including a letter and a chart is printed on a recording medium such as plain paper has been increasing in recent years. In such applications, an aqueous ink that can record an image excellent in a color developability and a fastness property is required. At the time of the recording of an image excellent in characteristics such as a color developability, a pigment ink using a pigment as its coloring material is often used. In addition, in a black ink, a carbon black is mainly used as a pigment. An improvement in a color developability of an image to be recorded with an ink using the carbon black as its pigment is a particularly important problem and hence various investigations have heretofore been made.

For example, there has been proposed an aqueous ink for ink jet containing a self-dispersible carbon black having a high DBP oil absorption and a large structure (Japanese Patent Application Laid-Open No. 2017-136846). In addition, there has been proposed a black ink for ink jet containing a carbon black, a resin particle having a blue dye and a resin particle having a fluorescent brightener (Japanese Patent Application Laid-Open No. 2019-143095). It is said that the use of the black ink improves the color developability of an image as follows: the bluish fluorescence of the fluorescent brightener and yellow reddish bronze light derived from the carbon black undergo additive color mixing to be close to a white color and hence a bronze phenomenon is suppressed.

The inventors of the present invention have investigated the aqueous ink proposed in Japanese Patent Application Laid-Open No. 2017-136846. As a result, the inventors have found that although an image having a somewhat satisfactory color developability can be recorded with the ink, a color developability-improving effect is not necessarily sufficient owing to a bronze phenomenon originating from the carbon black present on the surface of a recording medium. Further, the inventors of the present invention have also investigated the black ink proposed in Japanese Patent Application Laid-Open No. 2019-143095. As a result, the inventors have revealed that when a self-dispersible pigment of the carbon black having a large structure is used, the bronze phenomenon cannot be sufficiently suppressed and hence a color developability-improving effect becomes insufficient.

SUMMARY OF THE INVENTION

Accordingly, an object of the present invention is to provide an aqueous ink for ink jet that can record an image excellent in a color developability by suppressing a bronze phenomenon derived from a carbon black. Another object of the present invention is to provide an ink cartridge and an ink jet recording method each using the aqueous ink.

That is, according to the present invention, there is provided an aqueous ink for ink jet including a self-dispersible carbon black and a resin particle formed of an acrylic resin, wherein the carbon black has a DBP oil absorption of 120 mL/100 g or more, the acrylic resin particle has a glass transition temperature of 30° C. or more, and a mass ratio of a content (% by mass) of the resin particle to a content (% by mass) of the carbon black is 0.10 times or more to 2.0 times or less.

Further features of the present invention will become apparent from the following description of exemplary embodiments with reference to the attached drawings.

BRIEF DESCRIPTION OF THE DRAWINGS

FIG. 2A and FIG. 2B are views for schematically illustrating an example of an ink jet recording apparatus to be used in an ink jet recording method of the present invention, in which FIG. 2A is a perspective view of the main portion of the ink jet recording apparatus and FIG. 2B is a perspective view of a head cartridge.

DESCRIPTION OF THE EMBODIMENTS

Figure 1:
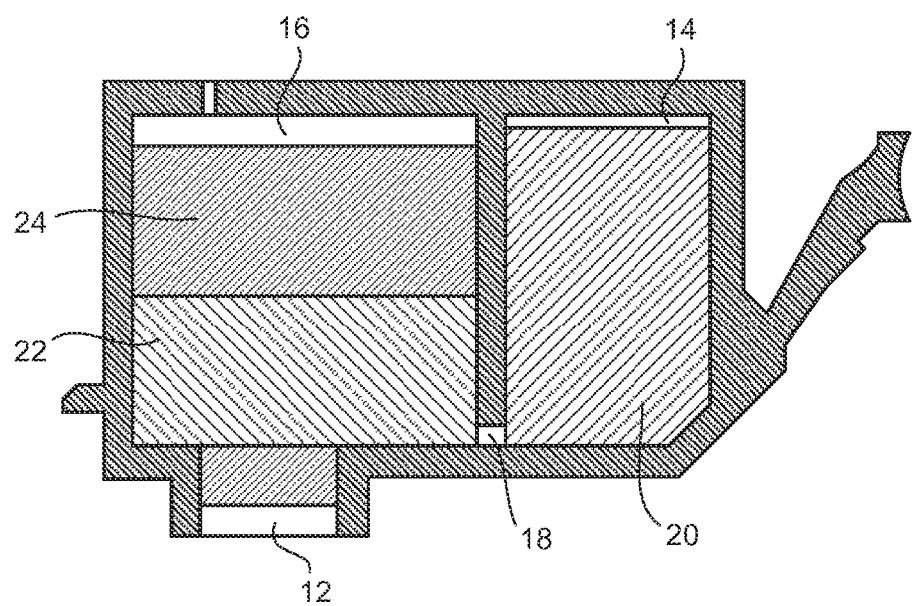
FIG. 1 is a sectional view for schematically illustrating one embodiment of the ink cartridge according to the present invention.

The present invention is described in more detail below by way of a preferred embodiment. In the present invention, when an ink contains a salt, although the salt is dissociated into ions in an ink, it is referred to as "containing salt" for convenience. In addition, an aqueous ink for ink jet may be simply described as an "ink". Physical property values are values at normal temperature (25° C.) unless otherwise stated.

A bronze phenomenon occurring in an image recorded with an ink containing a carbon black has heretofore been a problem whose handling has been investigated mainly in a glossy image recorded on a recording medium having surface gloss such as glossy paper. The inventors of the present invention have made investigations and as a result, have found that the bronze phenomenon also occurs in a non-glossy image recorded on a recording medium having no surface gloss such as plain paper and the phenomenon serves as one cause for a reduction in a color developability of the image.

The bronze phenomenon is a phenomenon in which the color of reflected light appears to be different from its original color owing to the fact that a refractive index on the surface of a pigment particle present on a recording medium has wavelength dependence. Accordingly, it is considered that as the exposure amount of the surface of the pigment particle on the surface of the recording medium becomes larger, the bronze phenomenon more remarkably occurs.

The inventors of the present invention have investigated an ink that can record an image having a high optical density and an excellent color developability by suppressing a bronze phenomenon derived from a carbon black. As a result, the inventors have found the combined use of a self-dispersible pigment of a carbon black having a DBP oil absorption of 120 mL/100 g or more and a resin particle formed of an acrylic resin, the particle having a glass transition temperature of 30° C. or more. Further, the inventors have found that it is effective to set the mass ratio of the content (% by mass) of the resin particle to the content (% by mass) of the carbon black to 0.10 times or more to 2.0 times or less. Thus, the inventors have reached the present invention.

The carbon black is dispersed in an aqueous medium under a state in which several to several tens of primary particles lie in a row to form a tufted structure. The size of the structure of the carbon black can be grasped by the DBP oil absorption of the carbon black. Specifically, a higher value of the DBP oil absorption means that the carbon black has a larger structure and hence has a bulkier structure. The use of the self-dispersible pigment of the carbon black having a large structure can improve the color developability of an image. It is considered that this is because after the ink has been applied to a recording medium, the aggregation of the carbon black is accelerated by the evaporation of a liquid component such as water in the ink and the aggregated carbon black is liable to remain on the surface of the recording medium. However, the inventors have made investigations and as a result, have found that when the carbon black is liable to remain on the surface of the recording medium, a bronze phenomenon derived from the carbon black remarkably occurs to impart a red to yellow color tone to the image and to inhibit an improvement in a color developability thereof. In view of the foregoing, the inventors of the present invention have investigated a reduction in amount of the pigment exposed to the surface of a pigment layer formed on the surface of the recording medium.

As a result of the investigation, the inventors of the present invention have found that the occurrence of the bronze phenomenon derived from the carbon black can be suppressed by adding a specific amount of an acrylic resin particle having a glass transition temperature equal to or more than a certain value to the ink. The inventors of the present invention have assumed a mechanism for the foregoing to be as described below. The presence of a particulate resin in the pigment layer formed on the surface of the recording medium increases the thickness of the pigment layer and reduces the density of the pigment in the pigment layer. It is assumed that as a result of the foregoing, the amount of the pigment exposed to the surface of the pigment layer reduces to suppress the bronze phenomenon. It is considered that the obtainment of such effect as described above requires the presence of a particulate acrylic resin particle in the pigment layer. To this end, the glass transition temperature (Tg) of the resin particle needs to be 30° C. or more. The temperature of a general recording environment is estimated to be at most 30° C. Accordingly, in the present invention, the glass transition temperature of the resin particle is specified to be 30° C. or more for recognizing that the resin particle keeps its particle shape in the recording environment. When the glass transition temperature of the resin particle formed of the acrylic resin is less than 30° C., the resin particle hardly remains in the pigment layer under the state of maintaining its particulate state. Thus, the bronze phenomenon cannot be suppressed. In addition, the resin particle needs to be formed of the acrylic resin. When a resin particle formed of a resin except the acrylic resin such as a wax resin particle is used, the bronze phenomenon cannot be suppressed and hence the color developability of the image reduces.

The mass ratio of the content (% by mass) of the resin particle to the content (% by mass) of the carbon black needs to be 0.10 times or more to 2.0 times or less. When the mass ratio is less than 0.10 times, the bronze phenomenon derived from the carbon black cannot be suppressed and hence the color developability of the image reduces. Meanwhile, when the mass ratio is more than 2.0 times, the color developability of the image reduces owing to an influence of the color tone of the resin particle, though the bronze phenomenon can be suppressed.

The DBP oil absorption of the carbon black is 120 mL/100 g or more. When the DBP oil absorption of the carbon black is less than 120 mL/100 g, its aggregation is weak and hence the color developability of the image to be recorded cannot be improved.

<Aqueous Ink>

The ink of the present invention is an aqueous ink for ink jet including a self-dispersible carbon black and a resin particle formed of an acrylic resin. The carbon black has a DBP oil absorption of 120 mL/100 g or more and the resin particle has a glass transition temperature (Tg) of 30° C. or more. In addition, the mass ratio of the content (% by mass) of the resin particle to the content (% by mass) of the carbon black is 0.10 times or more to 2.0 times or less. The respective components for forming the ink are described below.

(Pigment)

The ink contains the self-dispersible carbon black. Any carbon black may be used as the carbon black as long as the carbon black may be used in an ink for ink jet. Examples of the carbon black may include furnace black, lamp black, acetylene black, channel black and thermal black. Those carbon blacks may be used alone or in combination of two or more kinds. A dye or the like may be further incorporated into the ink for the purpose of, for example, toning its color.

The self-dispersible carbon black is a self-dispersible pigment in which a hydrophilic group such as an anionic group is bonded to the surface of a particle of the carbon black directly or through another atomic group. After the ink including the self-dispersible pigment has been applied to a recording medium, an increase in viscosity thereof and changes in state thereof, such as the association and aggregation of the pigment, are liable to occur owing to the evaporation of its liquid component such as water. Accordingly, the use of the self-dispersible carbon black can provide an ink that can record an image having a high optical density and an excellent color developability. Meanwhile, when not the self-dispersible carbon black but a resin-dispersed carbon black is used, the color developability of the image to be recorded cannot be improved.

The DBP oil absorption of the carbon black is 120 mL/100 g or more, preferably 130 mL/100 g or more. Although the upper limit of the DBP oil absorption is not particularly limited, the DBP oil absorption is preferably 200 mL/100 g or less, more preferably 180 mL/100 g or less. The DBP (dibutyl phthalate) oil absorption of the carbon black may be measured in conformity with ASTM D-2414. The DBP oil absorption of the carbon black has a correlation with the structure of the carbon black. The DBP oil absorption of a carbon black used in each of Examples to be described later is a value measured in conformity with ASTM D-2414.

Examples of the anionic group bonded to the surface of the particle of the carbon black directly or through another atomic group may include a carboxy group, a sulfo group, a phosphate group and a phosphonate group. Those anionic groups may form salts. When the anionic groups form salts, at least one proton of each of the groups is substituted with a cation. Examples of the cation may include an alkali metal ion, an ammonium ion and an organic ammonium ion. Examples of the alkali metal ion may include lithium, sodium and potassium ions. Examples of the organic ammonium ion may include cations of: aliphatic amines, such as mono to trialkylamines; and aliphatic alcohol amines, such as mono to trialkanolamines, and salts thereof. The anionic group is preferably of an alkali metal salt type such as a sodium or potassium salt type or of an ammonium salt type, more preferably of an alkali metal salt type such as a sodium or potassium salt type.

The anionic group may be directly bonded to the surface of the particle of the carbon black or may be bonded thereto through another atomic group (—R—). Examples of the other atomic group (—R—) may include: an alkylene group, such as a methylene group, an ethylene group or a propylene group; an arylene group, such as a phenylene group, a naphthylene group, an anthracenylene group, a phenanthrenylene group or a biphenylene group; a heteroarylene group, such as a pyridylene group, an imidazolylene group, a pyrazolylene group, a pyridinylene group, a thienylene group or a thiazolylene group; a carbonyl group; an ester group, such as a carboxylic acid ester group, a sulfonic acid ester group, a phosphoric acid ester group or a phosphonic acid ester group; an imino group; an amide group; a sulfonyl group; and an ether group. In addition, a group obtained by combining those groups may also be adopted. To obtain a high color developability, the anionic group bonded to the surface of the particle of the carbon black directly or through another atomic group is preferably a carboxylic acid group. To obtain a higher color developability, a self-dispersible pigment in which a carboxylic acid group is bonded to the surface of the particle of the carbon black through another atomic group is more preferably used.

The content (% by mass) of the carbon black in the ink is preferably 1.0% by mass or more to 10.0% by mass or less with respect to the total mass of the ink. In addition, the cumulative 50% particle diameter (D50) of the carbon black on a volume basis is preferably 50 nm or more to 150 nm or less. The simple term "average particle diameter" as used herein means a "cumulative 50% particle diameter (D50) on a volume basis." The "cumulative 50% particle diameter (D50) on a volume basis" may be measured with a particle size distribution-measuring apparatus based on a dynamic light scattering method. In addition, the BET specific surface area of the carbon black is preferably 200 $m^2/g$ or more to 400 $m^2/g$ or less, more preferably 220 $m^2/g$ or more to 300 $m^2/g$ or less. The BET specific surface area of the carbon black may be measured in conformity with JIS Z 8830:2013 (ISO 9277:2010).

(Resin Particle)

The ink contains the resin particle formed of the acrylic resin. The term "resin particle" means a particle that is formed of a resin and has such a particle diameter as to be capable of being present under the state of being dispersed in an aqueous medium. The resin particle may be produced in accordance with a known method. Examples of a method of producing the resin particle may include an emulsion polymerization method, a pre-emulsion polymerization method, a seed polymerization method and a phase inversion emulsification method. The resin particle is preferably present in an independent manner without being integrated with the self-dispersible pigment. That is, there is no need to adopt such forms as described below: the resin particle encapsulates the self-dispersible pigment; or the resin particle adheres to the self-dispersible pigment to disperse the pigment. Although the self-dispersible pigment can be dispersed by itself without aid of the resin, a case in which a state in which part of the resin particles adhere to the self-dispersible pigment is adopted is not excluded.

Whether or not a resin is a "resin particle" can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, the particle diameter of the resin in the sample solution is measured by a dynamic light scattering method. In this case, when a particle having the particle diameter is observed, the resin can be judged to be a "resin particle." A particle size analyzer (e.g., the product name "UPA-EX150" manufactured by Nikkiso Co., Ltd.) or the like may be used as a particle size distribution-measuring apparatus based on the dynamic light scattering method. Measurement conditions at this time may be set, for example, as follows: SetZero: 30 seconds, number of times of measurement: three times and measurement time: 180 seconds. The particle size distribution-measuring apparatus to be used, the measurement conditions and the like are of course not limited to the foregoing. It is because of the following purpose that the particle diameter is measured with the neutralized particle: to recognize the formation of a particle even when the resin is sufficiently neutralized to be brought into such a state as to more hardly form a particle.

The resin particle needs to be formed of the acrylic resin. The glass transition temperature (Tg) of the resin particle is 30° C. or more. The glass transition temperature of the resin particle is preferably 150° C. or less, more preferably 100° C. or less. The glass transition temperature of the resin particle may be measured with, for example, a differential scanning calorimeter. In the present invention, the glass transition temperature of the resin particle is a value measured for the very resin particle removed from the ink. A temperature cycle at the time of the measurement is preferably set to the following conditions: the temperature is increased from 25° C. to 200° C. at 10° C./min; the temperature is decreased from 200° C. to −50° C. at 5° C./min; and the temperature is increased from −50° C. to 200° C. at 10° C./min.

The content (% by mass) of the resin particle in the ink is preferably 1.0% by mass or more to 10.0% by mass or less, more preferably 1.5% by mass or more to 8.0% by mass or less with respect to the total mass of the ink. In addition, the mass ratio of the content (% by mass) of the resin particle in the ink to the content (% by mass) of the carbon black is 0.10 times or more to 2.0 times or less. The mass ratio is preferably 0.20 times or more to 1.0 times or less. In particular, the mass ratio is more preferably 0.30 times or more to 0.80 times or less. When the mass ratio is less than 0.20 times, the bronze phenomenon-suppressing effect may reduce to some extent and the color developability of an image may also reduce to some extent. Meanwhile, when the mass ratio is more than 1.0 times, the color developability of the image may reduce to some extent owing to an influence of the color tone of the resin particle, though a bronze phenomenon can be suppressed. The total content (% by mass) of the pigment and the resin particle in the ink is preferably 2.0% by mass or more to 20.0% by mass or less, more preferably 2.0% by mass or more to 10.0% by mass or less with respect to the total mass of the ink. In particular, the total content is particularly preferably 2.0% by mass or more to 7.5% by mass or less.

The cumulative 50% particle diameter (D50) of the resin particle in the ink on a volume basis is preferably 50 nm or more to 300 nm or less, more preferably 50 nm or more to 250 nm or less, particularly preferably 50 nm or more to 230 nm or less. When the cumulative 50% particle diameter of the resin particle in the ink is less than 50 nm, the pigment layer to be formed becomes thinner. Accordingly, the bronze phenomenon-suppressing effect may reduce to some extent and the color developability of the image may also reduce to some extent. Meanwhile, when the cumulative 50% particle diameter of the resin particle in the ink is more than 300 nm, an improving effect on the color developability of the image may reduce to some extent owing to an influence of the scattering of light, though the bronze phenomenon can be suppressed.

The ratio of the cumulative 50% particle diameter of the resin particle on a volume basis to the cumulative 50% particle diameter of the carbon black on a volume basis is preferably 0.50 times or more to 2.0 times or less. When the value of the ratio described above deviates from the predetermined range, the pigment layer to be formed becomes thinner. Accordingly, the bronze phenomenon-suppressing effect may reduce to some extent and the color developability of the image may also reduce to some extent.

The acid value of the acrylic resin forming the resin particle is preferably 5 mg KOH/g or more to 100 mg KOH/g or less, more preferably 5 mg KOH/g or more to 30 mg KOH/g or less. In addition, the weight-average molecular weight of the acrylic resin forming the resin particle is preferably 1,000 or more to 2,000,000 or less. The density of the anionic group of the resin particle (amount of the anionic group by mole per unit surface area) is preferably 1 $\mu$mol/m$^2$ or more to 500 $\mu$mol/m$^2$ or less, more preferably 1 $\mu$mol/m$^2$ or more to 50 $\mu$mol/m$^2$ or less.

The acrylic resin forming the resin particle preferably has a hydrophilic unit and a hydrophobic unit as its constituent units. The term "unit" of the resin as used herein refers to a unit structure derived from one monomer. A resin having the following units is preferred: a hydrophilic unit derived from (meth)acrylic acid; and a hydrophobic unit derived from at least one of a (meth)acrylic acid ester-based monomer or a monomer having an aromatic ring.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of those acidic monomers. Examples of a cation forming the salt may include ions of: alkali metals, such as lithium, sodium and potassium; ammonium; and organic ammonium. Of those, an ion of an alkali metal such as potassium is preferred.

The hydrophobic unit is a unit free of any hydrophilic group such as an anionic group. The hydrophobic unit may be formed by, for example, polymerizing a hydrophobic monomer free of any hydrophilic group such as an anionic group. Specific examples of the hydrophobic monomer may include: (meth)acrylic acid ester-based monomers, such as ethyl (meth)acrylate, methyl (meth)acrylate, butyl (meth)acrylate and 2-ethylhexyl (meth)acrylate; and monomers each having an aromatic ring, such as styrene, $\alpha$-methylstyrene and benzyl (meth)acrylate.

The resin particle preferably has a crosslinked structure. The resin particle having the crosslinked structure easily remains in the pigment layer under the state of maintaining its particulate state to a larger extent. Accordingly, the bronze phenomenon can be further suppressed. To incorporate the crosslinked structure into the resin particle, a monomer having two or more polymerizable functional groups such as ethylenically unsaturated bonds in a molecule thereof may be used. Specific examples of the monomer having two or more polymerizable functional groups in a molecule thereof may include: diene compounds, such as butadiene and isoprene; polyfunctional (meth)acrylates, such as 1,4-butanediol di(meth)acrylate, (poly)ethylene glycol di(meth)acrylate and trimethylolpropane tri(meth)acrylate; and divinylbenzene. When a resin particle free of any crosslinked structure is used, the bronze phenomenon-suppressing effect may reduce to some extent and the color developability of the image may also reduce to some extent.

The acrylic resin forming the resin particle preferably has a unit derived from a reactive surfactant. The dispersed state of the resin particle formed of the acrylic resin having the unit derived from the reactive surfactant is further stabilized by repulsion caused by steric hindrance. Accordingly, the use of the resin particle formed of the acrylic resin having the unit derived from the reactive surfactant can improve the ejection stability of the ink. In contrast, the use of a resin particle formed of an acrylic resin free of any unit derived from the reactive surfactant may reduce the ejection stability of the ink to some extent.

The following compound is preferably used as the reactive surfactant: a compound in which a polymerizable functional group, such as a (meth)acryloyl group, a maleyl group, a vinyl group or an allyl group, is bonded to the inside or terminal of a molecule thereof including a hydrophilic portion and a hydrophobic portion. Examples of the hydrophilic portion may include polyalkylene oxide chains, such as an ethylene oxide chain and a propylene oxide chain. In addition, examples of the hydrophobic portion may include structures, such as an alkyl group, an aryl group and a combination thereof.

(Salt Formed by Bonding of Monovalent Cation and Anion)

The ink preferably further contains a salt. The term "salt" means a compound formed by the bonding of a monovalent cation and an anion. The incorporation of the salt into the ink can accelerate the aggregation of its pigment in a recording medium and hence can further improve the color developability of an image.

Examples of the monovalent cation may include an alkali metal ion, an ammonium ion and an organic ammonium ion. Examples of the alkali metal ion may include a lithium ion, a sodium ion and a potassium ion. Examples of the organic ammonium ion may include cations of: alkylamines each having 1 or more to 3 or less carbon atoms, such as methylamine and ethylamine; and alkanolamines each having 1 or more to 4 or less carbon atoms, such as monoethanolamine, diethanolamine and triethanolamine. Of those, an alkali metal ion is preferred and a potassium ion is particularly preferred.

Examples of the anion may include $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$.

Examples of the salt formed by the bonding of the cation and the anion may include, when a monovalent cation is represented by M, MCl, MBr, MI, MClO, MClO$_2$, MClO$_3$, MClO$_4$, MNO$_2$, MNO$_3$, M$_2$SO$_4$, M$_2$CO$_3$, MHCO$_3$, HCOOM, (COOM)$_2$, COOH(COOM), CH$_3$COOM, C$_2$H$_4$(COOM)$_2$, C$_6$H$_5$COOM, C$_6$H$_4$(COOM)$_2$, M$_3$PO$_4$, M$_2$HPO$_4$ and MH$_2$PO$_4$. Of those, potassium chloride, sodium acetate, sodium benzoate, potassium benzoate, ammonium benzoate, trisodium citrate, potassium phthalate, ammonium phthalate and the like are preferred and potassium phthalate is particularly preferred. The incorporation of potassium phthalate can improve the ejection stability of the ink as compared to any other salt.

The content (% by mass) of the salt in the ink is preferably 0.05% by mass or more to 1.0% by mass or less, more preferably 0.1% by mass or more to 0.5% by mass or less with respect to the total mass of the ink.

(Aqueous Medium)

The ink is an aqueous ink containing at least water as an aqueous medium. As the aqueous medium, a water-soluble organic solvent may be further incorporated into the ink. Deionized water or ion-exchanged water is preferably used as the water. The content (% by mass) of the water in the ink is preferably 10.0% by mass or more to 90.0% by mass or less, more preferably 50.0% by mass or more to 90.0% by mass or less with respect to the total mass of the ink. In addition, as the water-soluble organic solvent, any one generally used in an ink may be used. Examples thereof may include alcohols, (poly)alkylene glycols, glycol ethers, nitrogen-containing compounds and sulfur-containing compounds. The content (% by mass) of the water-soluble organic solvent in the ink is preferably 3.0% by mass or more to 50.0% by mass or less with respect to the total mass of the ink.

(Other Additives)

The ink may contain a water-soluble organic compound that is solid at normal temperature (25° C.), for example, a polyhydric alcohol, such as trimethylolpropane or trimethylolethane, or a urea derivative, such as urea or ethylene urea, as required in addition to the above-mentioned components. Further, the ink may contain various additives, for example, a water-soluble resin, such as an acrylic resin or a urethane resin, a surfactant, a pH adjuster, a rust inhibitor, an antiseptic, an antifungal agent, an antioxidant, an antireducing agent, an evaporation accelerator and a chelating agent, as required. The content (% by mass) of any such additive in the ink is preferably 0.05% by mass or more to 10.0% by mass or less, more preferably 0.2% by mass or more to 5.0% by mass or less with respect to the total mass of the ink. However, when a water-soluble acrylic resin is used, it is preferred that its content be not set to a very large value. The content (% by mass) of the water-soluble acrylic resin in the ink is preferably 0.1% by mass or more to 1.5% by mass or less, more preferably 0.1% by mass or more to 1.1% by mass or less with respect to the total mass of the ink. In addition, a water-soluble urethane resin is effective in improving the scratch resistance of the image. The content (% by mass) of the water-soluble urethane resin in the ink is preferably 0.1% by mass or more to 5.0% by mass or less, more preferably 0.1% by mass or more to 2.0% by mass or less with respect to the total mass of the ink.

(Physical Properties of Ink)

The dynamic surface tension of the ink at a lifetime of 10 ms (millisecond) is preferably 40 mN/m or more, more preferably 45 mN/m or more. When the dynamic surface tension of the ink at a lifetime of 10 ms is 40 mN/m or more, the permeation of the ink in the thickness direction of the recording medium is moderately suppressed and hence an image that is more excellent in a color developability can be recorded. The dynamic surface tension of the ink at a lifetime of 10 ms is preferably 50 mN/m or less. The dynamic surface tension of the ink may be easily controlled by appropriately setting the kinds and contents of the surfactant and the water-soluble organic solvent to be incorporated into the ink. To set the dynamic surface tension of the ink at a lifetime of 10 ms to 40 mN/m or more, it is preferred that a water-soluble organic solvent having a low surface tension be not used, or if used, its content be not set to a large value.

The dynamic surface tension of the ink at a lifetime of 10 ms may be measured by a maximum bubble pressure method. The maximum bubble pressure method is a method including: measuring the maximum pressure required for the discharge of air bubbles produced at the tip of a probe (fine tube) immersed in a liquid to be subjected to measurement; and determining the surface tension of the liquid from the maximum pressure. The lifetime is a time period from the time point at which the surfaces of new air bubbles are produced at the tip of the probe to the time point at which it reaches the maximum bubble pressure (time point at which the radius of curvature of the air bubbles and the radius of the tip portion of the probe become equal to each other) in the maximum bubble pressure method. The dynamic surface tension of the ink herein is a value measured at 25° C.

The viscosity of the ink at 25° C. is preferably 1.0 mPa·s or more to 10.0 mPa·s or less, more preferably 1.0 mPa·s or more to 5.0 mPa·s or less. The static surface tension of the ink at 25° C. is preferably 30 mN/m or more to 45 mN/m or less. The pH of the ink at 25° C. is preferably 5.0 or more to 10.0 or less.

<Ink Cartridge>

An ink cartridge of the present invention includes an ink and an ink storage portion configured to store the ink. In addition, the ink stored in the ink storage portion is the aqueous ink of the present invention described above. FIG. 1 is a sectional view for schematically illustrating one embodiment of the ink cartridge according to the present invention. As illustrated in FIG. 1, an ink supply port 12 for supplying an ink to a recording head is arranged on the bottom surface of the ink cartridge. The inside of the ink cartridge is the ink storage portion for storing the ink. The ink storage portion includes an ink storage chamber 14 and an absorbent storage chamber 16 and the chambers communicate to each other through a communication port 18. In addition, the absorbent storage chamber 16 communicates to the ink supply port 12. While a liquid ink 20 is stored in the ink storage chamber 14, absorbents 22 and 24 each holding the ink in a state of being impregnated therewith are stored in the absorbent storage chamber 16. The ink storage portion may be of a form that is free of any ink storage chamber configured to store the liquid ink and is configured to hold the total amount of the ink to be stored with the absorbents. In addition, the ink storage portion may be of a form that is free of any absorbent and is configured to store the total amount of the ink in a liquid state. Further, an ink cartridge of a form formed to include the ink storage portion and a recording head may be adopted.

<Ink Jet Recording Method>

An ink jet recording method of the present invention is a method including ejecting the aqueous ink of the present invention described above from a recording head of an ink jet system to record an image on a recording medium. A system of ejecting the ink is, for example, a system for imparting mechanical energy to the ink or a system for imparting thermal energy to the ink. In the present invention, the system for imparting the thermal energy to the ink to eject the ink is particularly preferably adopted. The step of the ink jet recording method may be a known step except that the ink of the present invention is used. Even in a simple apparatus configuration free of any drying unit or the like, when the ink of the present invention is used, a bronze phenomenon derived from its carbon black is suppressed and hence an image excellent in a color developability can be recorded. Accordingly, in the ink jet recording method of the present invention, there is no need to perform a step of drying an image with heat or wind.

Figure 2A:
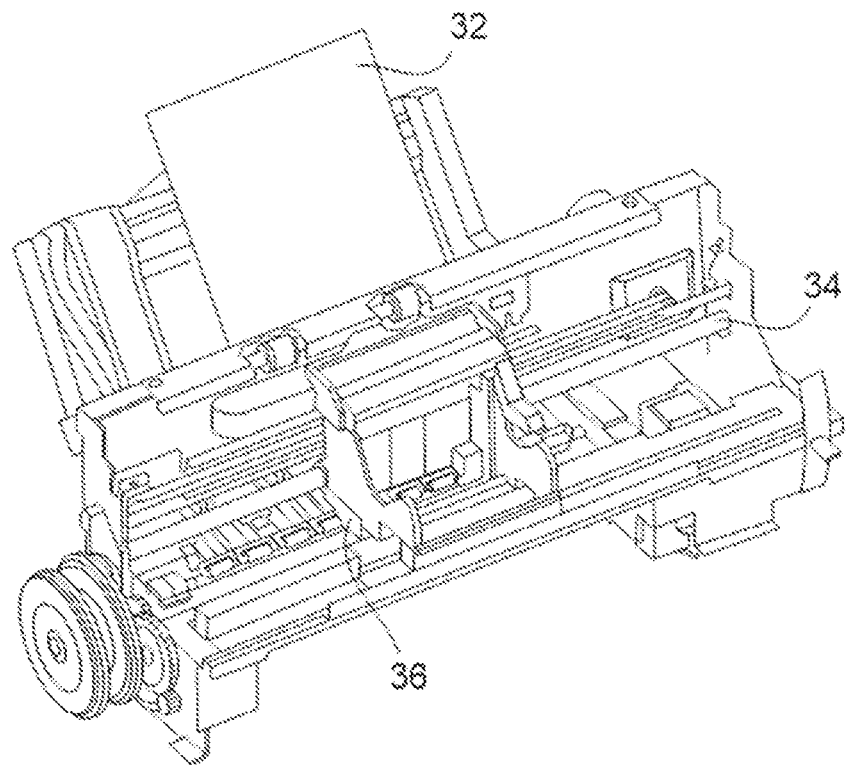
Figure 2B:
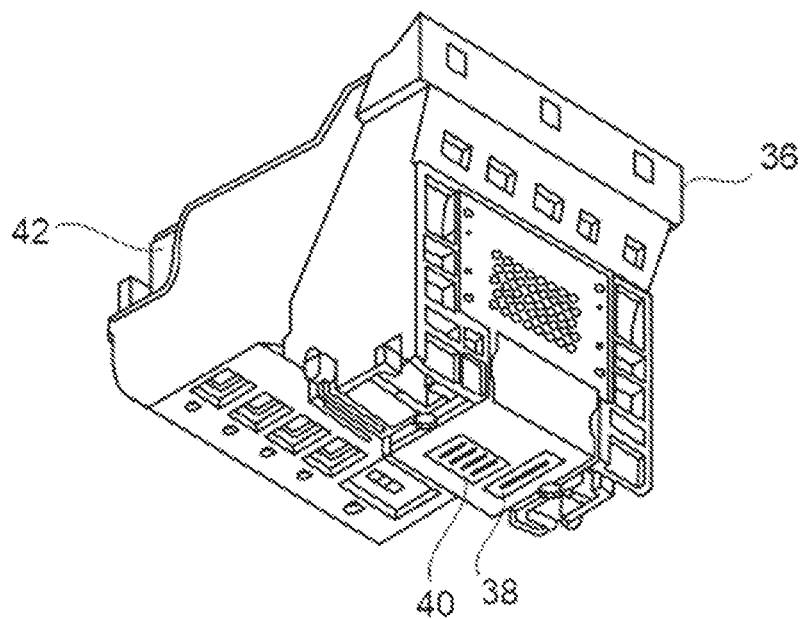

FIG. 2A and FIG. 2B are views for schematically illustrating an example of an ink jet recording apparatus to be used in the ink jet recording method of the present invention, in which FIG. 2A is a perspective view of the main portion of the ink jet recording apparatus and FIG. 2B is a perspective view of a head cartridge. The ink jet recording apparatus of this embodiment as shown in FIG. 2A includes a serial type recording head. However, the ink jet recording apparatus used in the ink jet recording method of the present invention is not limited to the one of the embodiments shown in FIG. 2A, and may be an ink jet recording apparatus including a line type recording head. A conveying unit (not shown) configured to convey a recording medium 32 and a carriage shaft 34 are arranged in the ink jet recording apparatus shown in FIG. 2A. A head cartridge 36 may be mounted on the carriage shaft 34. The head cartridge 36 includes recording heads 38 and 40 and is formed so that an ink cartridge 42 is set therein. While the head cartridge 36 is conveyed along the carriage shaft 34 in a main scanning direction, the ink (not shown) is ejected from the recording heads 38 and 40 toward the recording medium 32. Then, the recording medium 32 is conveyed by the conveying unit (not shown) in a sub-scanning direction. Thus, the image is recorded on the recording medium 32. In the present invention, an ink jet recording apparatus including a serial type recording head is preferably used. In addition, any recording medium may be used as the recording medium on which recording is to be performed with the ink of the present invention and a paper-based recording medium having permeability, such as plain paper or a recording medium including a coating layer (glossy paper or art paper), is preferably used. Of those, a recording medium free of any coating layer such as plain paper is particularly preferably used.

Examples

The present invention is described in more detail with reference to Examples and Comparative Examples below, but the present invention is not limited in any way by the following examples as long as the gist thereof is not exceeded. In the description of the amounts of components, "part(s)" and "%" are by mass unless otherwise specified.

The average particle diameter ($D_P$, cumulative 50% particle diameter on a volume basis) of a pigment was measured with a dynamic light scattering type particle diameter distribution-measuring apparatus (the product name: "UPA-EX150", manufactured by Nikkiso Co., Ltd.). Measurement conditions at this time were set as follows: SetZero: 30 seconds, number of times of measurement: three times and measurement time: 180 seconds.

<Preparation of Pigment Dispersion Liquid>

(Pigment Dispersion Liquids 1 to 4, 6 to 8 and 10)

A solution obtained by dissolving 5.0 g of concentrated hydrochloric acid in 5.5 g of water was brought into the state of being cooled to 5° C., followed by the addition of 1.6 g of a treatment agent shown in Table 1 thereto under the state. A container containing the solution was loaded into an ice bath. While the temperature of the solution was held at 10° C. or less by stirring the solution, a solution obtained by dissolving 1.8 g of sodium nitrite in 9.0 g of ion-exchanged water at 5° C. was added thereto. After the mixture had been stirred for 15 minutes, 6.0 g of a carbon black having characteristics shown in Table 1 was added thereto under stirring and the whole was further stirred for 15 minutes to provide a slurry. After the resultant slurry had been filtered with filter paper (the product name: "STANDARD FILTER PAPER No. 2," manufactured by Advantec Co., Ltd.), its particle was sufficiently washed with water and dried in an oven at 110° C. After the counter ion had been substituted from a sodium ion to a potassium ion by an ion exchange method, an appropriate amount of ion-exchanged water was added to the resultant to adjust the content of the pigment. Thus, respective pigment dispersion liquids of which each content of a pigment was 10.0% were obtained. The average particle diameters $D_P$ (nm) of the pigments and the structures of functional groups on the surfaces of the particles of the pigments are shown in Table 1.

(Pigment Dispersion Liquid 5)

Carbon black (specific surface area: 260 $m^2/g$, DBP oil absorption: 140 mL/100 g) was added to ion-exchanged water and the mixture was sufficiently stirred. An appropriate amount of sodium hypochlorite (effective chlorine concentration: 4%) was dropped into the mixture and the whole was stirred at 100° C. for 10 hours to be subjected to a reaction. After the completion of the reaction, the resultant was purified by ultrafiltration and its pH was adjusted to 7.5 using potassium hydroxide. Further, an appropriate amount of ion-exchanged water was added to the resultant to adjust the content of the pigment. Thus, a pigment dispersion liquid 5 of which the content of the pigment was 10.0% was obtained. The average particle diameter $D_P$ of the pigment was 115 nm. The pigment is a self-dispersible pigment in which a —COOK group is bonded to the surface of a particle of the carbon black.

(Pigment Dispersion Liquid 9)

A mixture was provided by mixing 15.0 Parts of a carbon black (specific surface area: 260 $m^2/g$, DBP oil absorption: 140 mL/100 g), 30.0 parts of an aqueous solution of a resin dispersant and 55.0 parts of ion-exchanged water. An aqueous solution of which the content of the resin was 20.0%, which was obtained by dissolving a styrene/acrylic acid copolymer that was a water-soluble resin in ion-exchanged water using sodium hydroxide whose molar amount was equal to the acid value, was used as the aqueous solution of the resin dispersant. The styrene/acrylic acid copolymer had a composition (molar) ratio between styrene and acrylic acid of 33:67, a weight-average molecular weight of 10,000 and an acid value of 200 mg KOH/g. The resultant mixture was loaded into a sand grinder and dispersed for 1 hour. After a coarse particle had been removed by centrifugation treatment, pressure filtration was performed with a microfilter having a pore size of 3.0 μm (manufactured by FUJIFILM Corporation). After that, an appropriate amount of ion-exchanged water was added to the filtrate to adjust the content of the pigment. Thus, a pigment dispersion liquid 9 of which the content of the pigment was 10.0% and the content of the resin dispersant was 6.0% was obtained. The average particle diameter $D_P$ of the pigment was 115 nm.

(Pigment Dispersion Liquid 11)

Into a glass container filled with zirconia beads each having a diameter of 0.3 mm at a ratio of 50%, 15.0 Parts of a carbon black (the product name: "MONARCH 1100" (manufactured by Cabot Corporation)), 30.0 parts of a 25.0% aqueous solution of a resin dispersant and 50.0 parts of ion-exchanged water were loaded. An aqueous solution, which was obtained by neutralizing a styrene/acrylic acid copolymer (the product name: "JONCRYL 690," manufactured by BASF Corporation) that was a water-soluble resin with potassium hydroxide at a molar ratio of 0.85 times with respect to the acid group, was used as the aqueous solution of the resin dispersant. The styrene/acrylic acid copolymer had a weight-average molecular weight of 16,500 and an acid value of 240 mg KOH/g. The contents of the glass container described above were mixed with a simple dispersing machine (the product name: "DAS200-K", manufactured by LAU Corporation) for 15 hours so that the carbon black was dispersed. The resultant was centrifuged at a number of revolutions of 5,000 rpm for 30 minutes so that an aggregated component was removed. After that, an appropriate amount of ion-exchanged water was added to the residue to adjust the content of the pigment. Thus, a pigment dispersion liquid 11 of which the content of the pigment was 15.0% and the content of the resin dispersant was 7.5% was obtained. The average particle diameter $D_P$ of the pigment was 80 nm.

TABLE 1

Preparation conditions and characteristics of pigment dispersion liquids

| Pigment dispersion liquid | Treatment agent | Carbon black Specific surface area (m²/g) | DBP oil absorption (mL/100 g) | Average particle diameter $D_P$ (nm) | Dispersion system | Functional group on particle surface |
|---|---|---|---|---|---|---|
| 1 | 4-Aminophthalic acid | 260 | 140 | 115 | Self-dispersible | —$C_6H_3$—$(COOK)_2$ |
| 2 | 4-Aminophthalic acid | 260 | 120 | 115 | Self-dispersible | —$C_6H_3$—$(COOK)_2$ |
| 3 | 4-Aminophthalic acid | 260 | 180 | 115 | Self-dispersible | —$C_6H_3$—$(COOK)_2$ |
| 4 | 4-Aminobenzenesulfonic acid | 260 | 140 | 115 | Self-dispersible | —$C_6H_4$—$SO_3Na$ |
| 5 | — | 260 | 140 | 115 | Self-dispersible | —COOK |
| 6 | 4-Aminophthalic acid | 300 | 140 | 50 | Self-dispersible | —$C_6H_3$—$(COOK)_2$ |
| 7 | 4-Aminophthalic acid | 220 | 140 | 180 | Self-dispersible | —$C_6H_3$—$(COOK)_2$ |
| 8 | 4-Aminophthalic acid | 240 | 140 | 150 | Self-dispersible | —$C_6H_3$—$(COOK)_2$ |
| 9 | — | 260 | 140 | 115 | Resin dispersed | — |
| 10 | 4-Aminophthalic acid | 260 | 110 | 115 | Self-dispersible | —$C_6H_3$—$(COOK)_2$ |
| 11 | — | 240 | 65 | 80 | Resin dispersed | — |

<Preparation of Resin Particle>
(Conditions for Measurement of Physical Properties)

The glass transition temperature of a resin particle was measured in accordance with the following procedure. First, a product obtained by warming a dispersion liquid of the resin particle to 60° C. to dry and solidify the dispersion liquid was sealed in an aluminum container to provide a sample. Next, the glass transition temperature (° C.) was measured with a differential scanning calorimeter (the product name: "DSC Q1000," manufactured by TA Instruments Corporation) as follows: the temperature of the sample was increased to 200° C. at 10° C./min; the temperature was decreased to −50° C. at 5° C./min; and the temperature was increased to 200° C. at 10° C./min. In addition, the average particle diameter ($D_R$, cumulative 50% particle diameter on a volume basis) of the resin particle was measured with a dynamic light scattering type particle diameter distribution-measuring apparatus (the product name: "UPA-EX150", manufactured by Nikkiso Co., Ltd.). Measurement conditions at this time were set as follows: SetZero: 30 seconds, number of times of measurement: three times and measurement time: 180 seconds.

(Resin Particles 1 to 16 and 18)

Ion-exchanged water whose amount was shown in Table 2 and 0.1 part of potassium persulfate were mixed under a nitrogen atmosphere to provide a solution. The emulsified product of a monomer whose kind and amount were shown in Table 2 was dropped into the solution and the mixture was subjected to a polymerization reaction under stirring at 80° C. After cooling to 25° C., potassium hydroxide whose molar amount was equal to the acid value of the resin and an appropriate amount of ion-exchanged water were added thereto to provide a dispersion liquid of a resin particle of which the content of the resin particle was 20.0%. The characteristics of the resin particles in the resultant dispersion liquids are shown in Table 2. The abbreviations of the monomers in Table 2 have the following meanings: MMA: methyl methacrylate; BMA: n-butyl methacrylate; EMA: ethyl methacrylate; MAA: methacrylic acid; AA: acrylic acid; BDDMA: 1,4-butanediol dimethacrylate; and KH-05: a reactive surfactant (the product name: "AQUALON KH-05," manufactured by DKS Co., Ltd.). The reactive surfactant (the product name: "AQUALON KH-05," manufactured by DKS Co., Ltd.) is a surfactant having a structure obtained by introducing an allyl group (polymerizable functional group) into the basic skeleton of a polyoxyethylene alkyl ether sulfuric acid ester salt.

(Resin Particle 17)

A dispersion liquid of a resin particle 17 of which the content of the resin particle was 20.0% was obtained by using a wax (resin particle) that was a copolymer of 1-octene and maleic anhydride. The resin particle 17 had a glass transition temperature Tg of 80° C. and an average particle diameter of 170 nm. The characteristics of the resin particle in the resultant dispersion liquid are shown in Table 2.

(Resin Particle 19)

In 40.0 parts of ethyl acetate, 2.0 Parts of C.I. Solvent Blue 70 (the product name: "Orasol Blue 855," manufactured by BASF Corporation) and 8.0 parts of a styrene-acrylic acid copolymer (the product name: "JONCRYL 611," manufactured by BASF Corporation) were dissolved to provide a solution. The resultant solution was added to a solution, which was obtained by dispersing 0.15 part of sodium dodecyl sulfate in 90.0 parts of ion-exchanged water, and the mixture was stirred. The mixture was emulsified with an ultrasonic homogenizer (the product name: "Advanced Digital Sonifier 250DA," manufactured by Branson Corporation) at an amplitude of 50% for 10 minutes to provide an emulsion. Ethyl acetate was distilled off from the resultant emulsion with an evaporator. After having been left standing to cool, pressure filtration was performed with a filter having a pore size of 1.2 μm (the product name: "HDCII", manufactured by Pall Corporation), followed by the addition of an appropriate amount of ion-exchanged water to the filtrate. Thus, a dispersion liquid of a resin particle 19 of which the content of the resin particle was 10.0% was obtained. The encapsulation ratio of a blue dye in the resin particle 19 was 20.0%. The characteristics of the resin particle in the resultant dispersion liquid are shown in Table 2.

(Resin Particle 20)

A dispersion liquid of a resin particle 20 was obtained in the same manner as in the case of the above-mentioned resin particle 19 except that C.I. Fluorescent Brightening Agent 184 (the product name: "Uvitex OB," manufactured by BASF Corporation) was used instead of C.I. Solvent Blue 70. The content of the resin particle in the resultant dispersion liquid was 10.0% and the encapsulation ratio of the fluorescent brightener (C.I. Fluorescent Brightening Agent 184) in the resin particle 20 was 20.0%. The characteristics of the resin particle in the resultant dispersion liquid are shown in Table 2.

TABLE 2

Synthesis conditions and characteristics of resin particles

| Resin particle | Ion-exchanged water (part(s)) | MMA | BMA | EMA | MAA | AA | BDDMA | KH-05 | Tg (°C.) | Average particle diameter $D_R$ (nm) | Crosslinked structure | Unit derived from reactive surfactant |
|---|---|---|---|---|---|---|---|---|---|---|---|---|
| 1 | 43.9 | 34.0 | 14.0 | | 2.0 | | 3.0 | 3.0 | 80 | 170 | Present | Present |
| 2 | 43.9 | 14.0 | | 34.0 | 2.0 | | 3.0 | 3.0 | 80 | 170 | Present | Present |
| 3 | 43.9 | 35.5 | 12.5 | | | 2.0 | 3.0 | 3.0 | 80 | 170 | Present | Present |
| 4 | 43.9 | 3.5 | 44.5 | | 2.0 | | 3.0 | 3.0 | 30 | 170 | Present | Present |
| 5 | 43.9 | 44.0 | 4.0 | | 2.0 | | 3.0 | 3.0 | 100 | 170 | Present | Present |
| 6 | 46.9 | 34.0 | 14.0 | | 2.0 | | | 3.0 | 80 | 170 | Absent | Present |
| 7 | 46.9 | 34.0 | 14.0 | | 2.0 | | 3.0 | | 80 | 170 | Present | Absent |
| 8 | 43.9 | 34.0 | 14.0 | | 2.0 | | 3.0 | 3.0 | 80 | 45 | Present | Present |
| 9 | 43.9 | 34.0 | 14.0 | | 2.0 | | 3.0 | 3.0 | 80 | 50 | Present | Present |
| 10 | 43.9 | 34.0 | 14.0 | | 2.0 | | 3.0 | 3.0 | 80 | 300 | Present | Present |
| 11 | 43.9 | 34.0 | 14.0 | | 2.0 | | 3.0 | 3.0 | 80 | 310 | Present | Present |
| 12 | 43.9 | 34.0 | 14.0 | | 2.0 | | 3.0 | 3.0 | 80 | 85 | Present | Present |
| 13 | 43.9 | 34.0 | 14.0 | | 2.0 | | 3.0 | 3.0 | 80 | 90 | Present | Present |
| 14 | 43.9 | 34.0 | 14.0 | | 2.0 | | 3.0 | 3.0 | 80 | 230 | Present | Present |
| 15 | 43.9 | 34.0 | 14.0 | | 2.0 | | 3.0 | 3.0 | 80 | 240 | Present | Present |
| 16 | 49.9 | 34.0 | 14.0 | | 2.0 | | | | 80 | 310 | Absent | Absent |
| 17 | — | — | — | — | — | — | — | — | 80 | 170 | Absent | Absent |
| 18 | 43.9 | 2.0 | 47.0 | | 1.0 | | 3.0 | 3.0 | 25 | 170 | Present | Present |
| 19 | — | — | — | — | — | — | — | — | 102 | 100 | Absent | Absent |
| 20 | — | — | — | — | — | — | — | — | 102 | 80 | Absent | Absent |

<Preparation of Ink>

The respective components (unit: %) shown in the upper stages of Table 3 were mixed and the mixture was sufficiently stirred to be dispersed. After that, pressure filtration was performed with a polypropylene filter having a pore size of 2.5 μm (manufactured by Pall Corporation) to prepare each ink. A numerical value attached to the term "Polyethylene glycol" in Table 3 is a number-average molecular weight and the term "ACETYLENOL E100" is the product name of a nonionic surfactant manufactured by Kawaken Fine Chemicals Co., Ltd. The characteristics of the respective prepared inks are shown in the lower stages of Table 3. With regard to the dynamic surface tension of each of the inks, a value at a lifetime of 10 ms was measured with a dynamic surface tension-measuring apparatus based on a maximum bubble pressure method (the product name: "Bubble Pressure Tensiometer BP2," manufactured by KRUSS Corporation).

TABLE 3

Compositions and characteristics of inks

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Kind of pigment dispersion liquid | 1 | 1 | 1 | 2 | 3 | 1 | 1 | 1 | 1 | 1 | 1 | 1 | 1 |
| Kind of resin particle | 1 | 2 | 3 | 1 | 1 | 4 | 5 | 1 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 | 40.0 |
| Dispersion liquid of resin particle | 10.0 | 10.0 | 10.0 | 10.0 | 10.0 | 10.0 | 10.0 | 2.0 | 40.0 | 3.6 | 4.0 | 20.0 | 22.0 |
| Potassium phthalate | 0.2 | 0.2 | 0.2 | 0.2 | 0.2 | 0.2 | 0.2 | 0.2 | 0.2 | 0.2 | 0.2 | 0.2 | 0.2 |
| Ammonium phthalate | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| 2-Pyrrolidone | | | | | | | | | | | | | |
| Polyethylene glycol 1000 | | | | | | | | | | | | | |
| ACETYLENOL E100 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 34.6 | 34.6 | 34.6 | 34.6 | 34.6 | 34.6 | 34.6 | 42.6 | 4.6 | 41.0 | 40.6 | 24.6 | 22.6 |
| Content of Pigment $C_P$ (%) | 4.0 | 4.0 | 4.0 | 4.0 | 4.0 | 4.0 | 4.0 | 4.0 | 4.0 | 4.0 | 4.0 | 4.0 | 4.0 |
| Content of Resin Particle $C_R$ (%) | 2.0 | 2.0 | 2.0 | 2.0 | 2.0 | 2.0 | 2.0 | 0.4 | 8.0 | 0.7 | 0.8 | 4.0 | 4.4 |
| Value of $C_R/C_P$ (times) | 0.5 | 0.5 | 0.5 | 0.5 | 0.5 | 0.5 | 0.5 | 0.1 | 2.0 | 0.18 | 0.20 | 1.0 | 1.1 |
| Average particle diameter $D_P$ of pigment (nm) | 115 | 115 | 115 | 115 | 115 | 115 | 115 | 115 | 115 | 115 | 115 | 115 | 115 |

TABLE 3-continued

Compositions and characteristics of inks

| | | | | | | | | | | | | | |
|---|---|---|---|---|---|---|---|---|---|---|---|---|---|
| Average particle diameter $D_R$ of resin particle (nm) | 170 | 170 | 170 | 170 | 170 | 170 | 170 | 170 | 170 | 170 | 170 | 170 | 170 |
| Value of $D_R/D_P$ (times) | 1.5 | 1.5 | 1.5 | 1.5 | 1.5 | 1.5 | 1.5 | 1.5 | 1.5 | 1.5 | 1.5 | 1.5 | 1.5 |
| Dynamic surface tension (mN/m) | 45 | 45 | 45 | 45 | 45 | 45 | 45 | 45 | 45 | 45 | 45 | 45 | 45 |

| | Example | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Kind of pigment dispersion liquid | 4 | 5 | 1 | 1 | 6 | 6 | 7 | 7 | 7 | 7 | 1 | 1 | 1 |
| Kind of resin particle | 1 | 1 | 6 | 7 | 8 | 9 | 10 | 11 | 12 | 13 | 14 | 15 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 | 40.0 |
| Dispersion liquid of resin particle | 10.0 | 10.0 | 10.0 | 10.0 | 10.0 | 10.0 | 10.0 | 10.0 | 10.0 | 10.0 | 10.0 | 10.0 | 10.0 |
| Potassium phthalate | 0.2 | 0.2 | 0.2 | 0.2 | 0.2 | 0.2 | 0.2 | 0.2 | 0.2 | 0.2 | 0.2 | 0.2 | 0.2 |
| Ammonium phthalate | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| 2-Pyrrolidone | | | | | | | | | | | | | |
| Polyethylene glycol 1000 | | | | | | | | | | | | | |
| ACETYLENOL E100 | 0.2 | 0.2 | 0.2 | 0.2 | 0.2 | 0.2 | 0.2 | 0.2 | 0.2 | 0.2 | 0.2 | 0.2 | 0.8 |
| Ion-exchanged water | 34.6 | 34.6 | 34.6 | 34.6 | 34.6 | 34.6 | 34.6 | 34.6 | 34.6 | 34.6 | 34.6 | 34.6 | 34.0 |
| Content of Pigment $C_P$ (%) | 4.0 | 4.0 | 4.0 | 4.0 | 4.0 | 4.0 | 4.0 | 4.0 | 4.0 | 4.0 | 4.0 | 4.0 | 4.0 |
| Content of Resin Particle $C_R$ (%) | 2.0 | 2.0 | 2.0 | 2.0 | 2.0 | 2.0 | 2.0 | 2.0 | 2.0 | 2.0 | 2.0 | 2.0 | 2.0 |
| Value of $C_R/C_P$ (times) | 0.5 | 0.5 | 0.5 | 0.5 | 0.5 | 0.5 | 0.5 | 0.5 | 0.5 | 0.5 | 0.5 | 0.5 | 0.5 |
| Average particle diameter $D_P$ of pigment (nm) | 115 | 115 | 115 | 115 | 50 | 50 | 180 | 180 | 180 | 180 | 115 | 115 | 115 |
| Average particle diameter $D_R$ of resin particle (nm) | 170 | 170 | 170 | 170 | 45 | 50 | 300 | 310 | 85 | 90 | 230 | 240 | 170 |
| Value of $D_R/D_P$ (times) | 1.5 | 1.5 | 1.5 | 1.5 | 0.9 | 1.0 | 1.7 | 1.7 | 0.47 | 0.50 | 2.0 | 2.1 | 1.5 |
| Dynamic surface tension (mN/m) | 45 | 45 | 45 | 45 | 45 | 45 | 45 | 45 | 45 | 45 | 45 | 45 | 39 |

| | Example | | | | Comparative Example | | | | | | | |
|---|---|---|---|---|---|---|---|---|---|---|---|---|
| | 27 | 28 | 29 | 30 | 1 | 2 | 3 | 4 | 5 | 6 | 7 | 8 |
| Kind of pigment dispersion liquid | 1 | 1 | 1 | 4 | 9 | 10 | 1 | 1 | 1 | 1 | 1 | 11 |
| Kind of resin particle | 1 | 1 | 1 | 16 | 1 | 1 | — | 17 | 18 | 1 | 1 | 19 + 20 |
| Pigment dispersion liquid | 40.0 | 40.0 | 40.0 | 40.0 | 40.0 | 40.0 | 40.0 | 40.0 | 40.0 | 40.0 | 40.0 | 20.0 |
| Dispersion liquid of resin particle | 10.0 | 10.0 | 10.0 | 3.6 | 10.0 | 10.0 | 0.0 | 10.0 | 10.0 | 1.6 | 42 | 25.0 + 15.0 |
| Potassium phthalate | 0.2 | 0.2 | | | 0.2 | 0.2 | 0.2 | 0.2 | 0.2 | 0.2 | 0.2 | |
| Ammonium phthalate | | | 0.2 | 0.2 | | | | | | | | |
| Glycerin | 10.0 | 10.0 | 10.0 | 10.0 | 10.0 | 10.0 | 10.0 | 10.0 | 10.0 | 10.0 | 10.0 | 7.0 |
| Triethylene glycol | 5.0 | 5.0 | 5.0 | 5.0 | 5.0 | 5.0 | 5.0 | 5.0 | 5.0 | 5.0 | 5.0 | |
| 2-Pyrrolidone | | | | | | | | | | | | 5.0 |
| Polyethylene glycol 1000 | | | | | | | | | | | | 5.0 |
| ACETYLENOL E100 | 0.7 | 0.1 | 0.2 | 0.8 | 0.2 | 0.2 | 0.2 | 0.2 | 0.2 | 0.2 | 0.2 | 1.0 |
| Ion-exchanged water | 34.1 | 34.7 | 34.6 | 40.4 | 34.6 | 34.6 | 44.6 | 34.6 | 34.6 | 43.0 | 2.6 | 22.0 |
| Content of Pigment $C_P$ (%) | 4.0 | 4.0 | 4.0 | 4.0 | 4.0 | 4.0 | 4.0 | 4.0 | 4.0 | 4.0 | 4.0 | 3.0 |
| Content of Resin Particle $C_R$ (%) | 2.0 | 2.0 | 2.0 | 0.7 | 2.0 | 2.0 | 0.0 | 2.0 | 1.0 | 0.3 | 8.4 | 4.0 |
| Value of $C_R/C_P$ (times) | 0.5 | 0.5 | 0.5 | 0.2 | 0.5 | 0.5 | 0.0 | 0.5 | 0.3 | 0.08 | 2.1 | 1.3 |
| Average particle diameter $D_P$ of pigment (nm) | 115 | 115 | 115 | 150 | 115 | 115 | 115 | 115 | 115 | 115 | 115 | 80 |

TABLE 3-continued

| Compositions and characteristics of inks | | | | | | | | | | | | |
|---|---|---|---|---|---|---|---|---|---|---|---|---|
| Average particle diameter $D_R$ of resin particle (nm) | 170 | 170 | 170 | 310 | 170 | 170 | — | 170 | 170 | 170 | 170 | 93 |
| Value of $D_R/D_P$ (times) | 1.5 | 1.5 | 1.5 | 2.1 | 1.5 | 1.5 | — | 1.5 | 1.5 | 1.5 | 1.5 | 1.2 |
| Dynamic surface tension (mN/m) | 40 | 50 | 45 | 39 | 45 | 45 | 45 | 45 | 45 | 45 | 45 | 38 |

<Evaluation>

The following respective items were evaluated by using the prepared inks. An ink jet recording apparatus (the product name: "GX6030", manufactured by Canon Inc.) including a recording head for ejecting a liquid through the action of thermal energy was used in image recording. In this example, the recording duty of a solid image recorded under the following condition is defined as 100%: two ink droplets each having a mass per droplet of 11.7 ng±10% are applied to a unit region measuring 1/600 inch by 1/600 inch. In the present invention, in the evaluation criteria of each of the items described below, while levels "AA", "A" and "B" were defined as acceptable levels, a level "C" was defined as an unacceptable level. The evaluation results are shown in Table 4.

(Color Developability)

Solid images each having a recording duty of 100% and each measuring 2 cm by 2 cm were recorded on 3 recording medium (plain paper, the product name: "CS-064F A4," manufactured by Canon Inc.). After the lapse of 1 day, the optical densities of the solid images were measured with a fluorescent spectrodensitometer (the product name: "FD-7", manufactured by Konica Minolta, Inc.) under the conditions of a lighting condition of M1 (D50), an observation light source of D50 and a field of view of 2°. Then, the average of the optical densities of the images recorded on the 3 recording medium was calculated and the color developability of the images was evaluated in accordance with the following evaluation criteria.

AA: The average of the optical densities was 1.46 or more.

A: The average of the optical densities was 1.43 or more to less than 1.46.

B: The average of the optical densities was 1.40 or more to less than 1.43.

C: The average of the optical densities was less than 1.40.

(Bronze Resistance)

Ten kinds of solid images each measuring 2 cm by 2 cm whose recording duties were changed from 10% to 100% in increments of 10% were recorded on recording medium (plain paper, the product name: "CS-064F A4," manufactured by Canon Inc.). After the lapse of 1 day, the recording duty of the solid image at which the image showed a red to yellow color tone, that is, a bronze phenomenon occurred was visually observed, followed by the evaluation of the bronze resistance of each of the images in accordance with the following evaluation criteria. In general, as the recording duty becomes higher, the quantity of light reflected from the image increases and hence the bronze phenomenon is more liable to occur. In other words, a higher recording duty at which the bronze phenomenon occurs means that the image is more excellent in bronze resistance.

A: No bronze phenomenon occurred no matter what recording duties the solid images had.

B: The bronze phenomena occurred in the solid images each having a recording duty of 70% or more.

C: The bronze phenomena occurred in the solid images each having a recording duty of less than 70%.

(Ejection Stability)

Solid images each having a recording duty of 100% and each measuring 2 cm by 2 cm were recorded on 10 recording medium (plain paper, the product name: "CS-064F A4," manufactured by Canon Inc.). After that, the nozzle check pattern of the GX6030 was recorded on the same kind of recording medium. Next, solid images were recorded on 3,000 sheets of the paper under the same conditions and then the nozzle check pattern was recorded again. The nozzle check pattern after the recording on the 10 sheets and the nozzle check pattern after the recording on the 3,000 sheets were compared to each other, followed by the evaluation of the ejection stability of each of the inks in accordance with the following evaluation criteria.

A: Each of the nozzle check patterns after the recording on the 10 sheets and after the recording on the 3,000 sheets was normally recorded.

B: Although the nozzle check pattern after the recording on the 10 sheets was normally recorded, disturbance was present in the nozzle check pattern after the recording on the 3,000 sheets.

C: Disturbance was present in each of the nozzle check patterns after the recording on the 10 sheets and after the recording on the 3,000 sheets.

TABLE 4

| | | Evaluation result | | |
|---|---|---|---|---|
| | | Color developability | Bronze resistance | Ejection stability |
| Example | 1 | AA | A | A |
| | 2 | AA | A | A |
| | 3 | AA | A | A |
| | 4 | AA | A | A |
| | 5 | AA | A | A |
| | 6 | AA | A | A |
| | 7 | AA | A | A |
| | 8 | A | B | A |
| | 9 | A | A | A |
| | 10 | A | B | A |
| | 11 | AA | A | A |
| | 12 | AA | A | A |
| | 13 | A | A | A |
| | 14 | B | A | A |
| | 15 | A | A | A |
| | 16 | A | B | A |
| | 17 | AA | A | B |
| | 18 | A | B | A |
| | 19 | AA | A | A |
| | 20 | AA | A | A |
| | 21 | A | A | A |
| | 22 | A | B | A |
| | 23 | AA | A | A |
| | 24 | AA | A | A |

TABLE 4-continued

| | | Evaluation result | | |
|---|---|---|---|---|
| | | Color developability | Bronze resistance | Ejection stability |
| | 25 | A | B | A |
| | 26 | A | A | A |
| | 27 | AA | A | A |
| | 28 | AA | A | A |
| | 29 | AA | A | B |
| | 30 | B | B | B |
| Comparative Example | 1 | C | A | A |
| | 2 | C | A | A |
| | 3 | C | C | A |
| | 4 | C | C | B |
| | 5 | C | C | A |
| | 6 | C | C | A |
| | 7 | C | A | A |
| | 8 | C | C | B |

According to the present invention, the aqueous ink for ink jet that can record an image excellent in a color developability by suppressing a bronze phenomenon derived from a carbon black can be provided. In addition, according to the present invention, the ink cartridge and the ink jet recording method each using the aqueous ink can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-158230, filed Sep. 28, 2021 and Japanese Patent Application No. 2022-136912, filed Aug. 30, 2022, which are hereby incorporated by reference herein in their entirety.

What is claimed is:

1. An aqueous ink for ink jet comprising a self-dispersible carbon black and a resin particle formed of an acrylic resin,
   wherein the carbon black has a DBP oil absorption of 120 mL/100 g or more,
   wherein the resin particle has (i) a structure crosslinked by a unit derived from a polyfunctional (meth)acrylate and (ii) a glass transition temperature of 30° C. or more,
   wherein a mass ratio of a content (% by mass) of the resin particle to a content (% by mass) of the carbon black is 0.10 times or more to 2.0 times or less, and
   wherein the carbon black is a self-dispersible pigment in which an anionic group is bonded to a surface of a particle of the carbon black through another atomic group.

2. The aqueous ink according to claim 1, wherein the mass ratio of the content (% by mass) of the resin particle to the content (% by mass) of the carbon black is 0.20 times or more to 1.0 times or less.

3. The aqueous ink according to claim 1, wherein the carbon black is a self-dispersible pigment in which a carboxylic acid group is bonded to a surface of a particle of the carbon black directly or through another atomic group.

4. The aqueous ink according to claim 1, wherein the resin particle has a cumulative 50% particle diameter on a volume basis of 50 nm or more to 300 nm or less.

5. The aqueous ink according to claim 1, wherein a ratio of a cumulative 50% particle diameter of the resin particle on a volume basis to a cumulative 50% particle diameter of the carbon black on a volume basis is 0.50 times or more to 2.0 times or less.

6. The aqueous ink according to claim 1, wherein the acrylic resin has a unit derived from a reactive surfactant.

7. The aqueous ink according to claim 1, wherein the aqueous ink has a dynamic surface tension at a lifetime of 10 ms of 40 mN/m or more.

8. The aqueous ink according to claim 1, further comprising a potassium phthalate.

9. An ink cartridge comprising an ink and an ink storage portion configured to store the ink,
   wherein the ink comprises the aqueous ink of claim 1.

10. An ink jet recording method comprising ejecting an ink from a recording head of an ink jet system to record an image on a recording medium,
    wherein the ink comprises the aqueous ink of claim 1.

11. The aqueous ink according to claim 1, wherein the carbon black is a self-dispersible pigment in which a functional group having a phthalic acid structure or a benzene sulfonic acid structure is bonded to a surface of a particle of the carbon black.

12. The aqueous ink according to claim 1, wherein the carbon black is a self-dispersible pigment in which a functional group having a phthalic acid structure is bonded to a surface of a particle of the carbon black.

13. The aqueous ink according to claim 1, wherein the mass ratio of the content (% by mass) of the resin particle to the content (% by mass) of the carbon black is 0.30 times or more to 0.80 times or less.

14. The aqueous ink according to claim 1, wherein the carbon black has a DBP oil absorption of 180 mL/100 g or less.

15. The aqueous ink according to claim 1, wherein the resin particle has a glass transition temperature of 150° C. or less.

16. The aqueous ink according to claim 1, wherein the resin particle has a glass transition temperature of 100° C. or less.

17. The aqueous ink according to claim 1, wherein the content (% by mass) of the carbon black in the ink is 1.0% by mass or more to 10.0% by mass or less with respect to the total mass of the ink.

18. The aqueous ink according to claim 1, wherein the content (% by mass) of the resin particle in the ink is 1.0% by mass or more to 10.0% by mass or less with respect to the total mass of the ink.

19. The aqueous ink according to claim 7, wherein the aqueous ink has a dynamic surface tension at a lifetime of 10 ms of 45 mN/m or more.

20. The aqueous ink according to claim 7, wherein the aqueous ink has a dynamic surface tension at a lifetime of 10 ms of 50 mN/m or less.

* * * * *